May 11, 1926.
F. YARDLEY
1,584,587
RADIATOR VALVE
Original Filed May 22, 1925
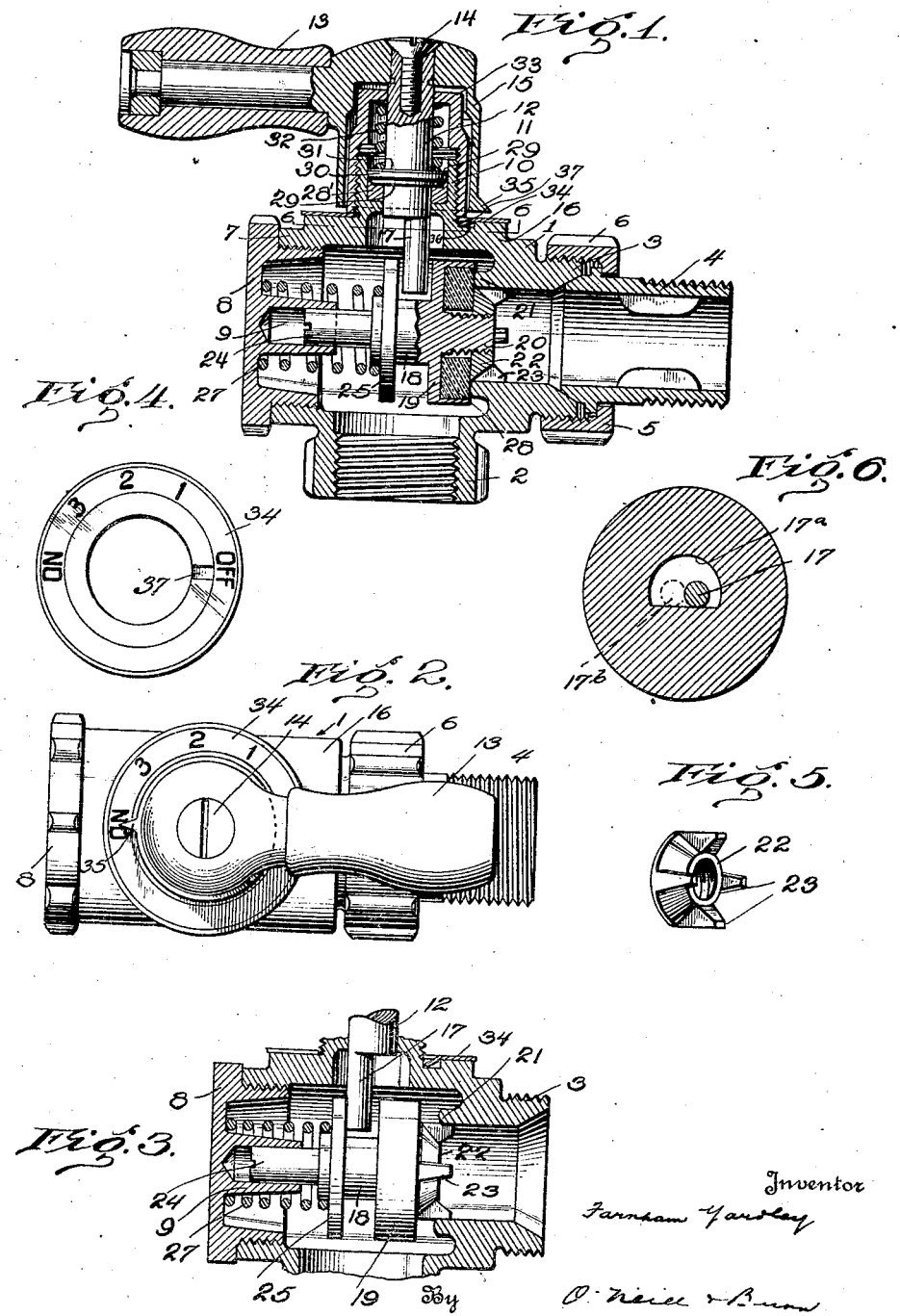

Patented May 11, 1926.

1,584,587

UNITED STATES PATENT OFFICE.

FARNHAM YARDLEY, OF NEW YORK, N. Y., ASSIGNOR TO JENKINS BROS., OF NEW YORK, N. Y., A CORPORATION OF NEW JERSEY.

RADIATOR VALVE.

Continuation of application Serial No. 32,008, filed May 22, 1925. This application filed February 23, 1926. Serial No. 90,101.

This invention relates to improvements in radiator valves, and especially to valves adapted for application to one-pipe or two-pipe low pressure steam, vapor or vacuum systems.

The object of the invention is the provision of a radiator valve of the class described which will not only be economical from a manufacturing standpoint, but which will function with maximum efficiency.

Other objects of the invention will be made apparent in the following specification, taken in connection with the drawings forming a part thereof.

This application is a continuation of my copending application, Ser. No. 32,008, filed May 22, 1925.

In said drawings:

Fig. 1 is a longitudinal cross sectional view of the valve, certain of the operative parts being shown in full lines.

Fig. 2 is a top plan view of the valve.

Fig. 3 is a view somewhat similar to Fig. 1, certain of the operative parts being shown in full lines, and shown in another position of adjustment.

Fig. 4 is a perspective view of an indicator disk forming a part of my invention.

Fig. 5 is a perspective view of the disk-guide nut used in the valve assembly, and, Fig. 6 is a cross section on the line 6—6 of Fig. 1.

Now referring specifically to the drawings, in which similar reference characters indicate like parts throughout the several views, the valve consists of a housing 1, provided with an apertured extension 2, internally threaded in the usual manner for connection to the supply pipe, and an externally screw-threaded extension 3, adapted to connect the casing to the radiator. Such latter connection may be effected in the usual manner, as by means of a short section of pipe 4, and an adjustable union nut 5. The nut 5 is provided with spaced parallel ribs or beads 6, instead of being in the shape of the customary hexagon, since it is usually manipulated by means of a Stillson wrench, which destroys the edges of hexagonal nuts, but in which are provided clamping jaws adapted to operatively fit the ribs 6 without any marring effect.

The opposite side of the casing 1 is provided with an internally screw-threaded extension 7, provided with an aperture normally closed by a screw-threaded plug 8. The interior face of the plug 8 is centrally provided with an integral sleeve or socket 9, for a purpose to be hereinafter described.

At the top of the valve, in the view shown in Fig. 1, and opposite the extension 2, is provided another tubular extension 10 carrying external screw threads adapted for co-operation with threads internally carried on a cap 11. The extension 10 is interiorally provided with a laterally extending flange which defines a centrally located circular opening leading into the body of the valve, said opening being adapted to surround and closely fit the operating spindle 12 of the valve, as will be presently described. The spindle 12 extends upwardly through the cap 11, and an operating handle 13 is fitted over the top end of the spindle and secured thereto by a screw 14. Carried by the inner end of the handle 13, is a depending sleeve 15, concentrically and closely surrounding the cap 11, and terminating adjacent a flattened circular rim 16 formed upon the top of the casing.

The operating spindle 12 consists of a circular rod, and is provided on its lower face with a crank arm 17, of circular cross-section, and extending below the spindle 12 and in a plane at one side of the longitudinal axis thereof.

The upper portion of the arm 17 swings in a pocket formed in the rim 16 of the casing 1, as best seen in Figs. 1, 3 and 6. The pocket is defined by a curved side wall 17$^a$, and an opposite flat wall 17$^b$. Rotation of the spindle 12 causes the arm 17 to travel in the circular path defined by the curved wall 17$^a$, the wall 17$^b$ operating as a stop when the arm 17 has reached the extreme position of movement in either direction, as shown in Fig. 6, in which position the valve is either wholly open or wholly closed.

The valve consists of a body portion 18 terminating at one end in a valve head 19 in the shape of a cupped disk, and provided with a screw-threaded central projection 20, extending in a line coincident with the longitudinal axis of the extension 3. The valve is provided with a vertical seat 21, comprising a rounded, inwardly-facing shoulder, formed on the inner face of the valve casing and surrounding the aperture formed in the extension 3. A circularly-formed, disk-guide nut 22 is screw-threaded onto the projection 20, and at all times is reciprocable within the aperture in the extension 3, as clearly shown in Figs. 1 and 3. On its outer face the disk-guide nut is provided with a plurality of evenly spaced projections 23, whereby, upon reciprocation of the nut, to graduate the amount of vapor passing into the extension 3, past the valve seat 21.

The opposite end of the body portion 18 of the valve is provided with a stem 24, which slidingly fits into the socket 9, carried by the plug 8, and, between the stem 24 and the head 19, the body 18 carries a disk 25, rigidly secured thereto. The disk 25 is provided on the side adjacent the socket 9, with an integrally-formed collar 26. A coiled spring 27 surrounds the socket 9, and the collar 26, said spring bearing at one end against the inner face of the plug 8, and at the other end against the opposite face of the disk 25, the tendency of the spring being at all times to hold the disk 25 away from the plug 8.

It will be noted that the diameter of the disk 25 is practically co-extensive with that of the head 19, and that the crank arm 17 extends downwardly to a point between said disk and the flat inner face of said head. It will be manifest therefore that a rotation of the spindle 12, from the position shown in Fig. 1, will cause the arm 17 to engage the face of the disk 25 and push it towards the plug 8, against the power of the spring 27, and that such movement causes the disk-guide nut 22 to move inwardly within the aperture in the extension 3. It may here be explained that tne cup-shaped portion of the head 19 is filled with a material or insert 28, which normally makes close contact with the valve seat 21, and that the disk-guide nut 22 is screwed up tightly against said material or insert 28, and retains it in position. In the position shown in Fig. 1, the spring 27 is pressing the insert 28 closely against the valve seat 21, but under the rotation of spindle 12 as just described, the disk-guide nut 22 has moved to the position shown in Fig. 3, and the vapor may pass through the inlet extension 2, past the projections 23, and through the outlet extension 3 into the pipe 4. A reverse rotation of the spindle 12 will obviously break contact between the projection 17 and the disk 25, and permit the spring 27 to restore the head 19 to its closed position against the seat 21.

Within the cap 11, I provide a packing washer 28' which rests upon the top of the valve casing, and perforated to receive the spindle 12. Formed integral with the spindle 12, is a collar 29 having stepped flanges 29' and 30, and a washer 31 is seated on the flange 30. Another washer 33 surrounds the spindle 12 and is positioned directly under the cap 11. A coiled spring 32 surrounds the upper portion of the spindle 12, and its lower end is seated on the top metal washer 31, and its upper end bears upon the washer 33 positioned against the closed top of the cap 11. The body of the spring is so proportioned that it presses the collar or flange 29 tightly upon the washer 28', with a force sufficient to prevent reverse rotation of the spindle 12, under pressure of the spring 27, and also prevents vapor passing through the stuffing box.

The valve described is obviously capable of various adjustments to vary the degree of inward reciprocation of the disk-guide nut 22 and, consequently, the degree of the size of the openings between the projections 23 for the passage of vapor. In order to indicate to the user the particular position of the head 19 at all times, I mount an indicator ring 34 upon the rim 16, and a pointer 35 is carried on the lower periphery of the sleeve 15, just above the ring 34. The ring carries the indications "On"—3—2—1—"Off", and, in the position shown in Fig. 1, the valve is "Off" and the contact of the arm 17, against the wall 17$^b$, prevents further rotation of the handle 13 to the right, the insert 28 contacting the seat 21. Rotation of the pointer 35 to the left will successively cause it to coincide with the numerals 1, 2 or 3, in which positions the slide is successively permitting more vapor to pass the apertures 23, and continued rotation to the left will entirely open the valve and cause the arm 17 to again engage the flat wall 17$^b$, as shown in dotted lines, Fig. 6, in which position the valve is entirely open, or "On". Reverse rotation of the handle 13 will obviously cause the disk-guide nut 22 to move inwardly of the aperture in the extension 3, and gradually close the apertures defined by the projections 23, and gradually shut off the flow of vapor as the arm 17 approaches the flat wall 17$^b$ of the pocket.

In order to lock the ring 34 in its proper position so that it will at all times accurately indicate the condition of the internal mechanisms of the valve, I provide a depression 36 in the rim 16, adapted for the reception of a tongue 37 formed integrally with the ring 34.

From the foregoing it is obvious that I have provided a valve structure which may be adjusted as desired, and which will always retain its position until the handle is rotated. Furthermore the valve is fitted with a vertical seat, as differentiated from the usual valve constructions, thereby eliminating the probability of deposits thereon, which deposits would operate detrimentally to the closing operation, as will be understood by those skilled in the art. Another exceptional advantage of a valve provided with a vertical seat resides in the fact that the valve may be used with one-pipe low-pressure steam or vapor systems, since the steam will enter at the top and the condensation drain away at the bottom of the seat.

In valves with horizontal seats, when used on the one-pipe systems, the valves cannot be properly throttled, since the steam, in trying to pass a seat with accumulated deposits thereon, is resisted by the water of condensation attempting to pass through the same openings, causing gurgling, water hammering and other objectionable noises. The valve forming the subject matter of this application is capable of a very fine degree of adjustment, and the friction devices referred to are capable of holding it securely in any adjusted position.

Modifications of the structure herein described may be suggested to those skilled in the art, but the invention covers all embodiments falling fairly within the scope of the appended claims.

What I claim is:

1. In a radiator valve, a casing having an inlet port and an outlet port, a vertically disposed valve seat surrounding said outlet port, a valve reciprocable in alignment with said outlet port and adapted to contact said seat, resilient means normally pressing the valve to said seat, a valve spindle, means carried by the spindle for moving the valve from its seat, and means adjacent the spindle and adapted to frictionally prevent rotation thereof under the influence of said resilient means, substantially as described.

2. In a radiator valve, a casing having an inlet port and an outlet port, a vertically disposed valve seat surrounding said outlet port, a valve head mounted for reciprocation to contact said seat and close said outlet port, a disk-guide nut secured to said head and reciprocable within said outlet port and provided with projections which define apertures governing the passage of vapor under the reciprocation of said head, resilient means normally retaining said head against said seat, a valve spindle, means carried by one end of said spindle adapted for moving said head from said seat, a packing cap surrounding the other end of said spindle, and means adjacent said other end of said spindle and adapted to impose friction on the latter whereby to prevent rotation of the spindle under the influence of the resilient means operating on said valve, substantially as described.

3. In a radiator valve, a casing having an inlet port and an outlet port, a vertically disposed valve seat surrounding the entrance to said outlet port, a valve head carrying an insert adapted to contact said seat under reciprocation of said head towards the seat, a coiled spring exerting its influence to press said insert against said seat, a guide member secured to said head and extending into said outlet port, said guide being peripherally provided with a plurality of projections which define apertures adapted, under the movement of the guide, to present gradually varying passages for vapor under the movements of the head and after the insert has left its seat, an operating spindle extending into the casing, means carried by the inner end of the spindle adapted to move said head to break contact between the said insert and the valve seat, and means bearing on said spindle and frictionally preventing rotation of the latter under the influence of said resilient means.

4. In a radiator valve, a casing having an inlet port, and an outlet port, a valve seat surrounding the inner end of said outlet port, a valve head adapted for movement to contact said seat, a guide-nut secured to said head and extending into said outlet port, said guide-nut being provided with a plurality of projections defining openings adapted to present vapor passages of constantly varying area as the valve head is moved toward and away from its seat, means constantly pressing said head towards said seat, an operating handle adapted to move said valve away from its seat, an indicator plate carried by the casing and calibrated to indicate the position of the valve head, and a pointer carried by the handle and adapted, during the movements of the latter, to successively point to the various calibrations on said plate.

5. In a radiator valve, a casing having an inlet port and an outlet port, a valve seat surrounding the inner end of said outlet port, a valve head adapted for movement to contact said seat, a guide-nut secured to said head and extending into said outlet port, said guide-nut being provided with a plurality of projections defining openings adapted to present vapor passages of constantly varying area as the valve head is moved toward and away from its seat, means constantly pressing said head towards said seat, an operating handle adapted to move said head away from its seat, an indicator plate carried by the casing and calibrated to indicate the position of the valve head, a tongue extending from said plate and entering a recess in said casing, whereby to prevent rotation of the plate with respect to the casing, and a pointer carried by the handle and adapted, during the movements of the latter, to successively point to the various calibrations on said plate.

6. In a radiator valve, a casing having an inlet port and an outlet port, a vertically disposed valve seat surrounding said outlet port, a valve reciprocable in alignment with said port and adapted to contact said seat, a valve spindle, an arm depending from the end of said spindle, and mounted for travel in a circular path under rotation of the latter, a disk carried by said valve and mounted in the circular path of travel of said arm, whereby contact between said arm and said disk may reciprocate said valve, and a flat wall carried on the casing limiting the movement of said arm in each direction.

In testimony whereof I affix my signature.

FARNHAM YARDLEY.